US010935631B2

(12) United States Patent
Storz et al.

(10) Patent No.: US 10,935,631 B2
(45) Date of Patent: Mar. 2, 2021

(54) RADAR TRANSCEIVER WITH A SWITCHED LOCAL OSCILLATOR

(71) Applicant: NAVICO HOLDING AS, Egersund (NO)

(72) Inventors: Gregor Storz, Auckland (NZ); Michael Cann, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 360 days.

(21) Appl. No.: 15/961,406

(22) Filed: Apr. 24, 2018

(65) Prior Publication Data

US 2019/0324118 A1    Oct. 24, 2019

(51) Int. Cl.
*G01S 7/03* (2006.01)

(52) U.S. Cl.
CPC ..................... *G01S 7/03* (2013.01)

(58) Field of Classification Search
None
See application file for complete search history.

(56) References Cited

U.S. PATENT DOCUMENTS

| 3,713,154 A | 1/1973 | Kummer |
| 4,021,805 A | 5/1977 | Effinger et al. |
| 4,028,700 A | 6/1977 | Carey et al. |
| 4,047,173 A | 9/1977 | Miller |
| 4,114,154 A | 9/1978 | Sarfati |
| 4,211,485 A | 7/1980 | Koreicho |
| 4,216,474 A | 8/1980 | Levine |
| 4,243,988 A | 1/1981 | Kang et al. |
| 4,328,495 A | 5/1982 | Thue |
| 4,353,067 A | 10/1982 | Mims |
| 4,450,410 A * | 5/1984 | Kliger ................ H03L 7/089 327/157 |
| 4,566,010 A | 1/1986 | Collins |
| 4,626,853 A | 12/1986 | Lee et al. |
| 4,686,534 A | 8/1987 | Eddy |

(Continued)

FOREIGN PATENT DOCUMENTS

| CN | 101464513 A | 6/2009 |
| JP | 2982769 B2 | 11/1999 |
| JP | 2009-128278 A | 6/2009 |

OTHER PUBLICATIONS

CN105306047 machine translation (Year: 2016).*

*Primary Examiner* — Whitney Moore
(74) *Attorney, Agent, or Firm* — Nelson Mullins Riley & Scarborough LLP

(57) ABSTRACT

Example radar apparatuses including a phase lock loop circuit used for processing both transmission signals and reflection signals are provided herein. An example apparatus includes a transmit signal generator electrically connected to an antenna and configured to generate a transmission signal at a transmit frequency, a receiver circuit electrically connected to the antenna and configured to receive a radar return signal and downconvert the radar return signal at a downconvert frequency for signal processing, and a phase lock loop circuit configured to be tuned to output both at the transmit frequency for transmission of the transmission signal by the antenna and the downconvert frequency for downconverting a frequency of the radar return signal for further signal processing. The transmit frequency is different from the downconvert frequency.

18 Claims, 9 Drawing Sheets

(56) References Cited

U.S. PATENT DOCUMENTS

| | | |
|---|---|---|
| 4,707,670 A | 11/1987 | Dakin |
| 4,772,889 A | 9/1988 | Elleaume |
| 4,800,388 A | 1/1989 | Okada |
| 4,929,954 A | 5/1990 | Elleaume |
| 4,989,010 A | 1/1991 | Crevoulin et al. |
| 5,003,313 A | 3/1991 | Doriath |
| 5,128,681 A | 7/1992 | McGroary et al. |
| 5,141,308 A | 8/1992 | Danckwerth et al. |
| 5,151,702 A | 9/1992 | Urkowitz |
| 5,173,706 A | 12/1992 | Urkowitz |
| 5,309,161 A | 5/1994 | Urkowitz et al. |
| 5,389,933 A | 2/1995 | Golinsky |
| 5,414,428 A | 5/1995 | Gallagher et al. |
| 5,481,270 A | 1/1996 | Urkowitz et al. |
| 6,067,043 A | 5/2000 | Faure et al. |
| 6,377,204 B1 | 4/2002 | Wurman et al. |
| 7,019,686 B2 | 3/2006 | Hester et al. |
| 7,106,250 B2 | 9/2006 | Blunt et al. |
| 7,157,985 B2 | 1/2007 | Mitani et al. |
| 7,423,578 B1* | 9/2008 | Tietjen ............... G01S 7/03 342/157 |
| 7,675,458 B2 | 3/2010 | Hubbard et al. |
| 7,688,257 B1 | 3/2010 | Christianson et al. |
| 7,764,223 B2 | 7/2010 | Wade |
| 8,022,863 B1 | 9/2011 | Nuthalapati |
| 9,810,772 B2 | 11/2017 | Storz |
| 2002/0141510 A1 | 10/2002 | Sridharan et al. |
| 2008/0111734 A1 | 5/2008 | Fam et al. |
| 2009/0121920 A1 | 5/2009 | Mullarkey et al. |
| 2011/0013724 A1* | 1/2011 | Metreaud ............ H04L 27/364 375/296 |
| 2012/0262332 A1 | 10/2012 | Ohnishi |
| 2012/0293361 A1 | 11/2012 | Mowbray et al. |
| 2019/0260617 A1* | 8/2019 | Ott ............... H03C 3/0983 |

\* cited by examiner

RADAR TRANSCEIVER WITH A SWITCHED LOCAL OSCILLATOR

FIELD OF THE INVENTION

Embodiments of the present invention relate generally to radar transceivers, and more particularly, to systems and apparatuses for radar transceivers with a switched local oscillator.

BACKGROUND OF THE INVENTION

Conventional radio transceiver architectures for pulse compression radar include a plurality of local oscillators to generate signals at a transmission frequency and downconvert received signals for processing. Typically a reference oscillator of the transceiver will generate an Intermediate Frequency (IF) and use a first local oscillators (LO) to upconvert the IF to the transmission frequency and a second oscillator to downconvert the frequency of a radar return signal received by a receiver (RX) to a frequency suitable for input to an analog to digital converter (ADC) for further signal processing.

BRIEF SUMMARY OF THE INVENTION

Some example local oscillators may be phase lock loop circuits (PLLs) configured to maintain an output signal in phase with the input signal. A PLL may include a variable frequency oscillator and a phase detector in a feedback loop. The oscillator generates an output signal and the phase detector compares the phase of the output signal to the phase of the input signal and adjusts the oscillator to keep the phases matched. Generally, PLLs, as well as other transceiver circuits and/or components, are selected to minimize size and power draw of the transceiver.

In some example radar transceiver arrangements, a single high performance local oscillator (LO) is used to provide both the transmission frequency and the downconvert frequency for signal processing. The LO may utilize dead time between the transmission and the receipt of the return signal to switch from the transmission frequency to the downconvert frequency, e.g. offset. For example, the transceiver may be configured to frequency modulate a phase lock loop circuit (PLL) at the transmit frequency. As the transceiver needs to digitize the return signal at an IF for signal processing, the receiver circuit needs the offset, which was formerly supplied by a separate LO, e.g. a receiver LO. In an example embodiment, the offset may be provided by the high performance LO, without a separate receiver LO.

In an example embodiment, the high performance LO may be a PLL with a very high loop bandwidth, such as at least 20 MHz. The PLL may include an emitter-coupled logic (ECL) phase detector. The ECL phase detector may be configured with a phase detection frequency of at least 250 MHz, which may enable switching of the PLL from the transmit frequency to the downconvert frequency in approximately 10-20 ns. However, use of ECL phase detectors may cause an increase in the size of PLL and/or power draw of the PLL.

In some example embodiments, the source frequency supplied to the PLL may be supplied by a direct digital synthesizer (DDS). The DDS may be configured to change the source frequency by generating a coherent sweep and the transmission frequency generated by the PLL may be a frequency sweep pulse based on the coherent sweep, for example an up sweep. This frequency modulation pattern may minimize the difference between the end of the coherent sweep of the transmission frequency and the downconvert, or offset, frequency.

In an example embodiment, an apparatus includes a transmit signal generator for a pulse compression radar. The transmit signal generator is electrically connected to an antenna and configured to generate a transmission signal at a transmit frequency. The apparatus also includes a receiver circuit electrically connected to the antenna and configured to receive a radar return signal and downconvert the radar return signal at a downconvert frequency for signal processing and a phase lock loop circuit configured to be tuned to output both at the transmit frequency for transmission of the transmission signal by the antenna and at the downconvert frequency for downconverting a frequency of the radar return signal for further signal processing. The transmit frequency is different from the downconvert frequency.

In some example embodiments, the output of the phase lock loop circuit repeatedly shifts between the transmit frequency and the downconvert frequency.

In an example embodiment, the phase lock loop circuit has a loop bandwidth of at least 20 MHz.

In some example embodiments, the phase lock loop circuit includes an emitter-coupled logic (ECL) phase detector. In an example embodiment, the ECL phase detector has a phase detection frequency of at least 250 MHz.

In an example embodiment the apparatus also includes a direct digital synthesizer (DDS) configured to supply a source frequency to the phase lock loop circuit. In some example embodiments, the DDS is configured to change the source frequency by generating a coherent sweep and the transmit frequency includes a frequency sweep pulse based on the coherent sweep.

In some example embodiments, the frequency sweep pulse includes an up sweep or a down sweep.

Example embodiments of the present invention include example radar transceivers, systems, and methods of manufacture thereof. The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Figure 1A:
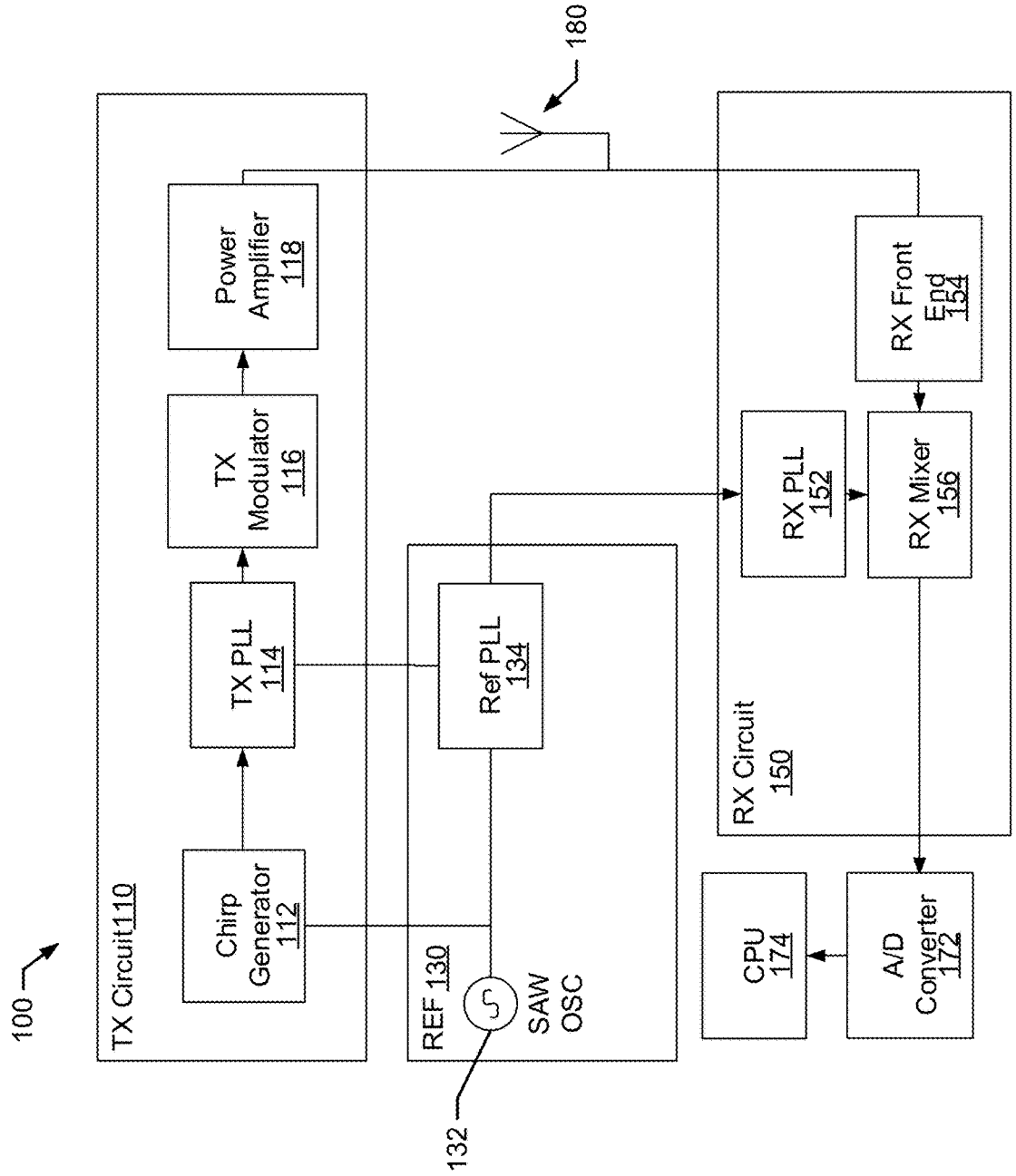
Figure 1B:
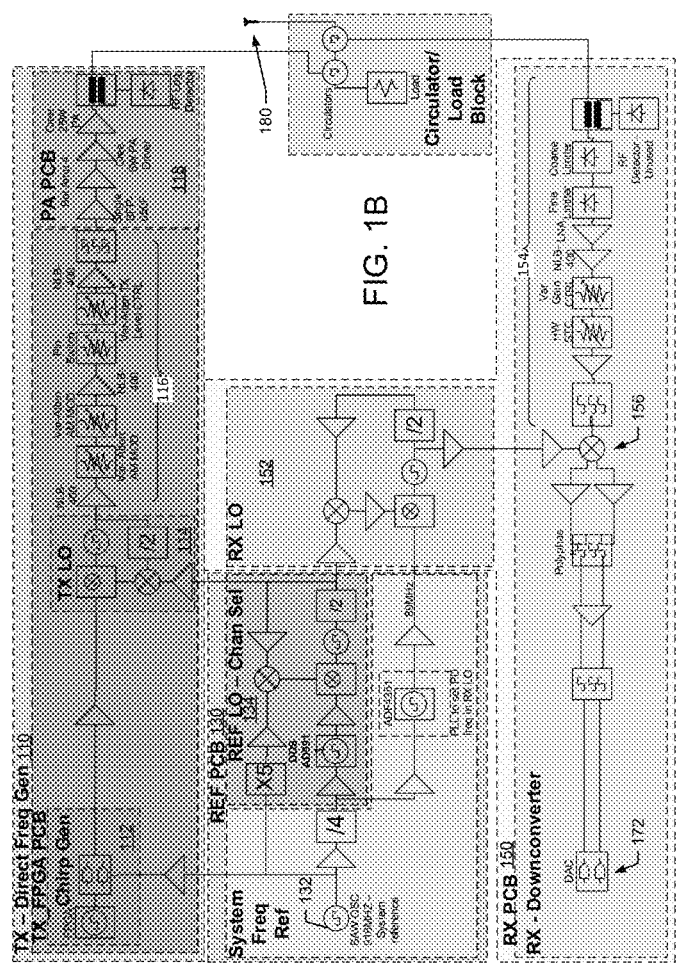
Figure 2A:
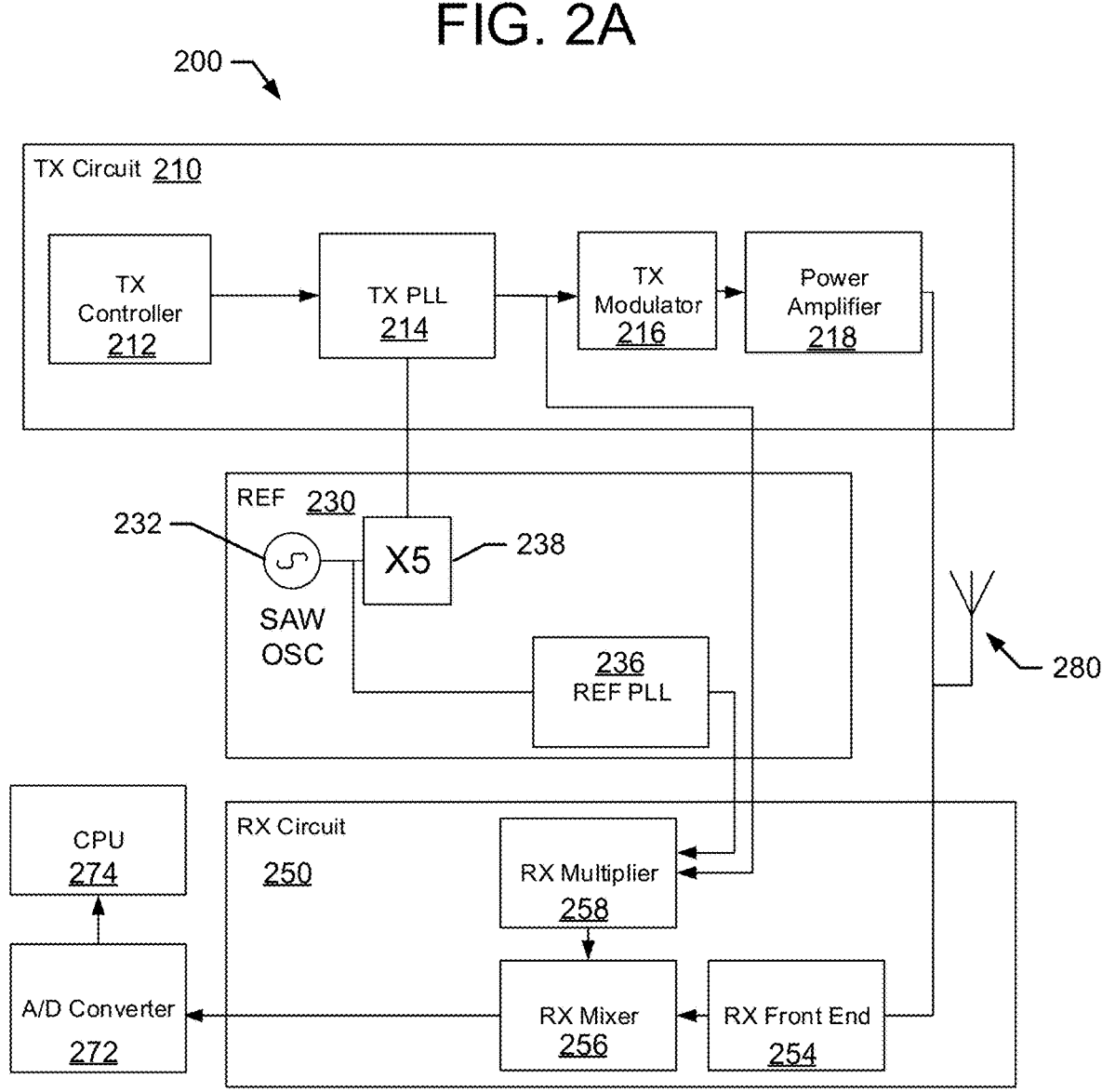
Figure 2B:
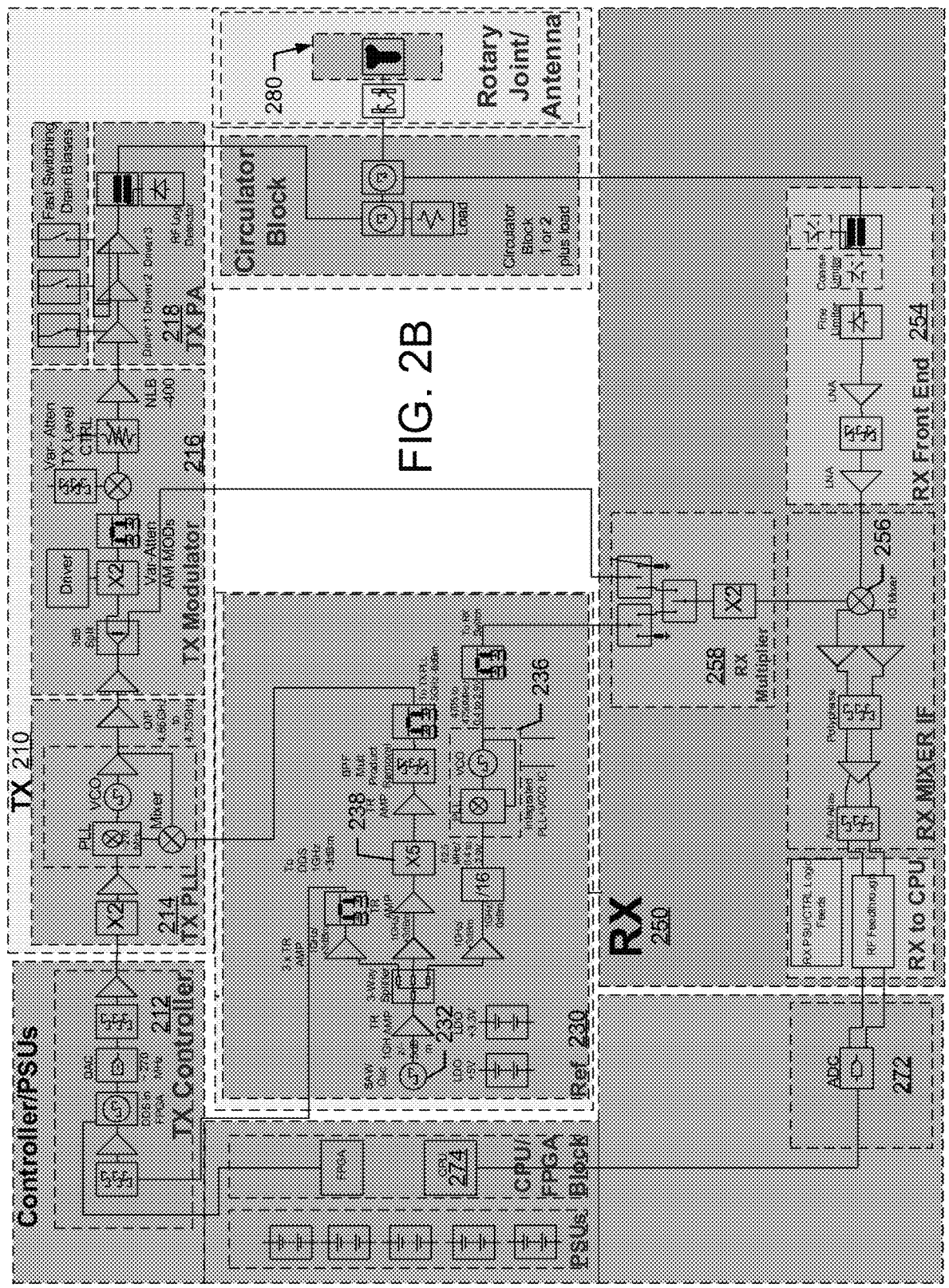
Figure 3A:
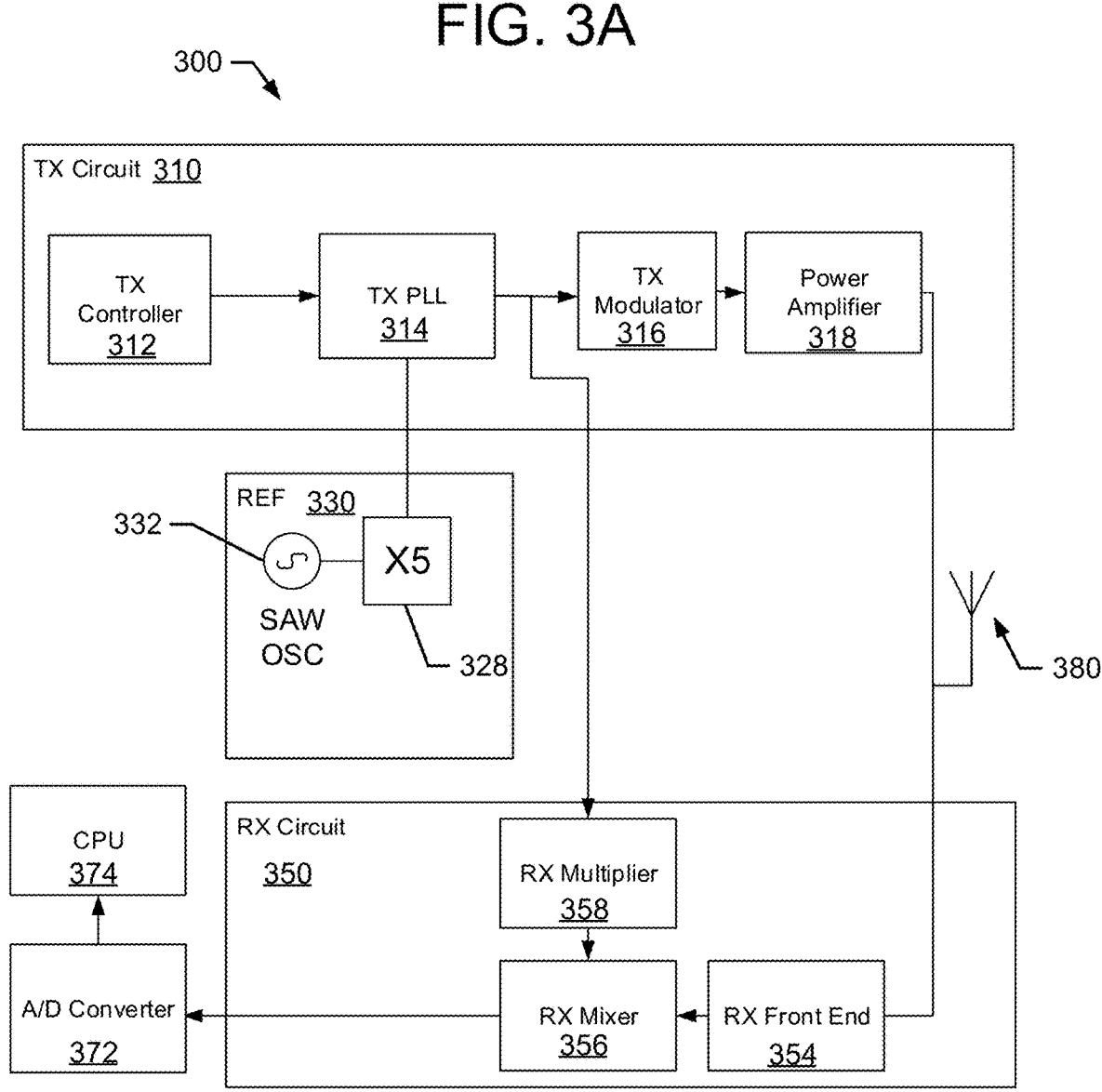
Figure 3B:
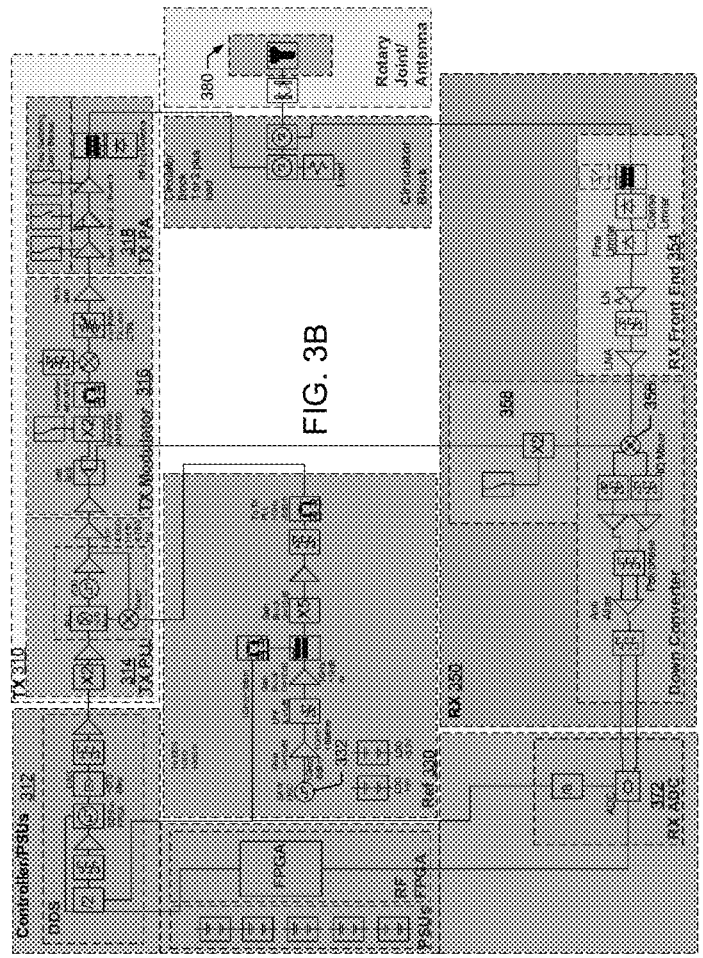
Figure 4:
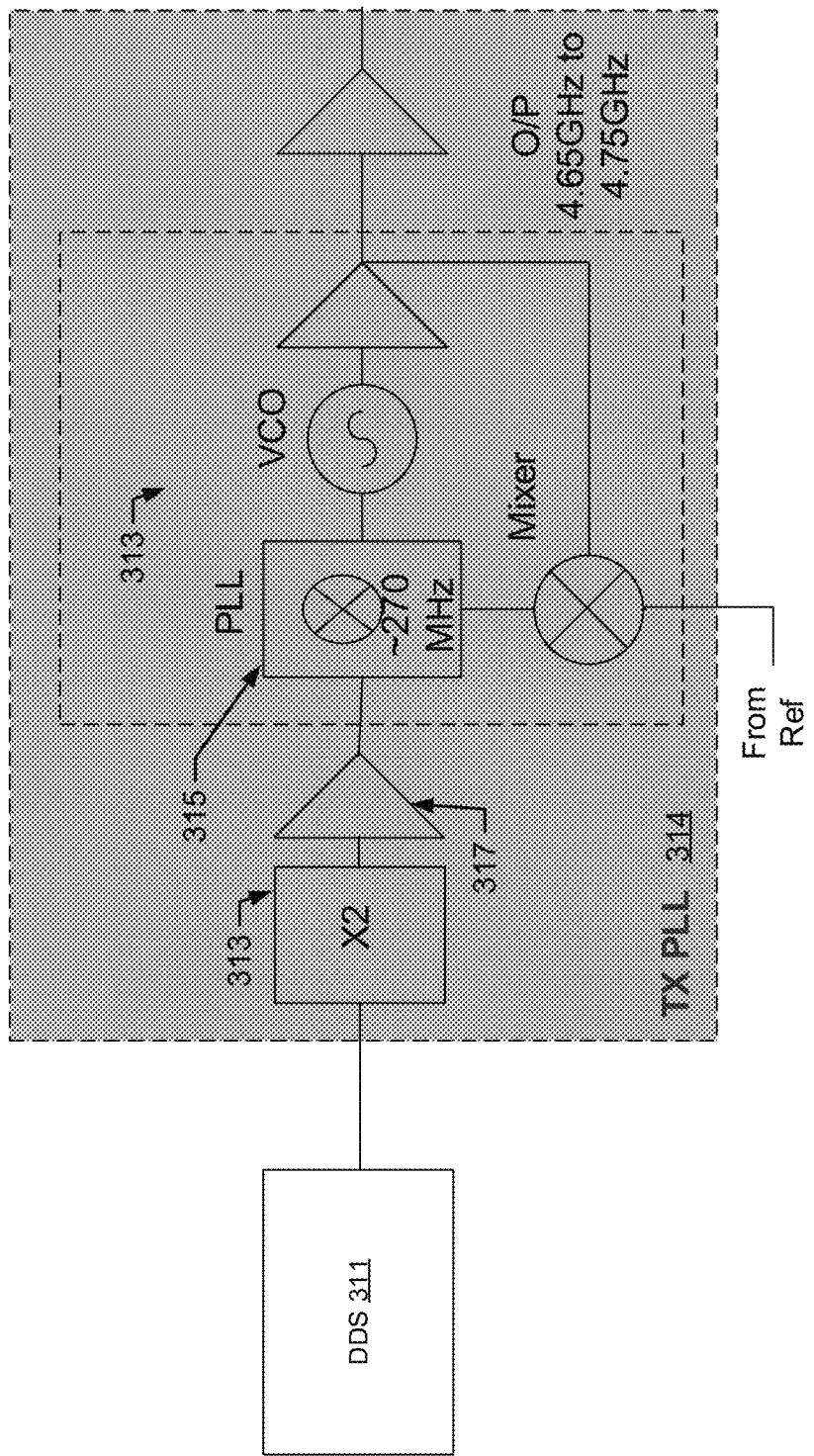
Figure 5:
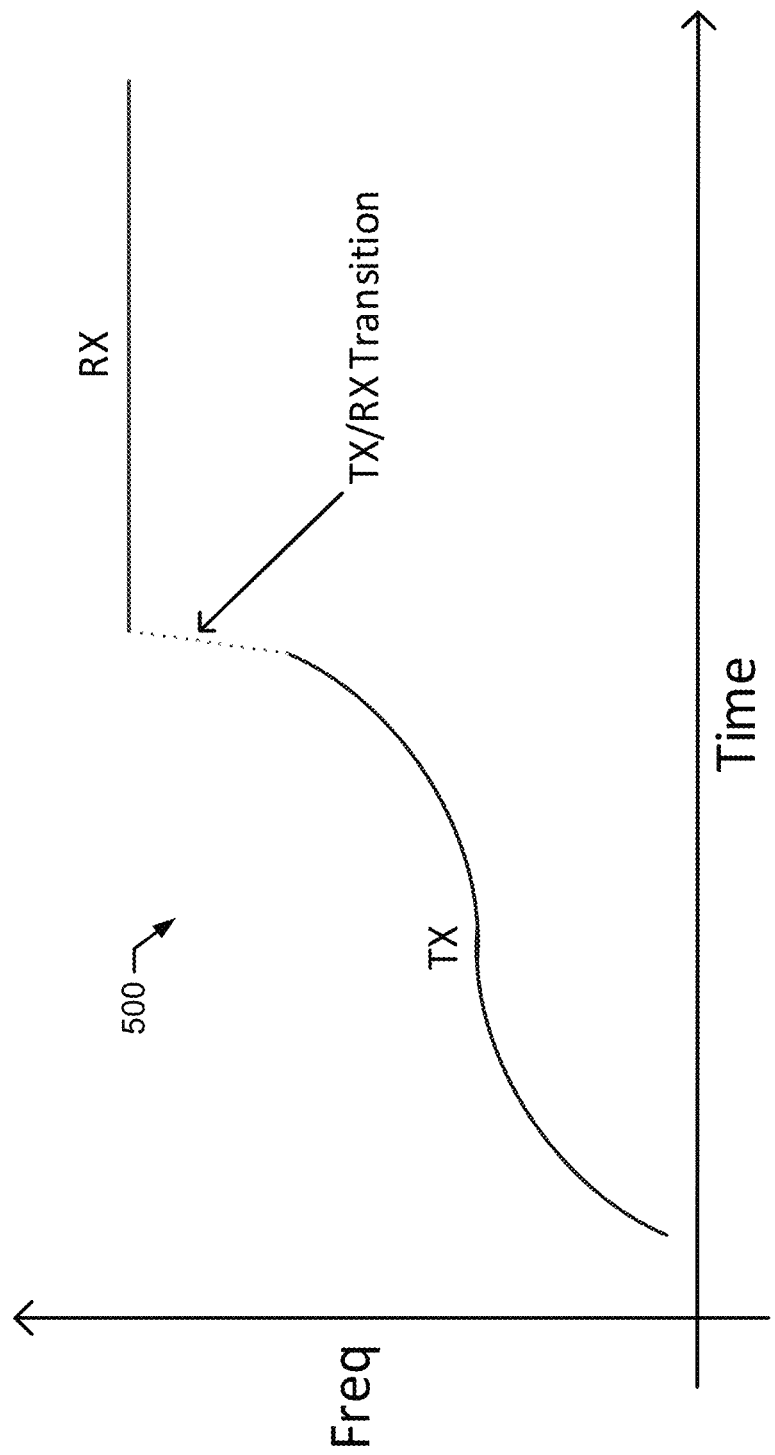
Figure 6:
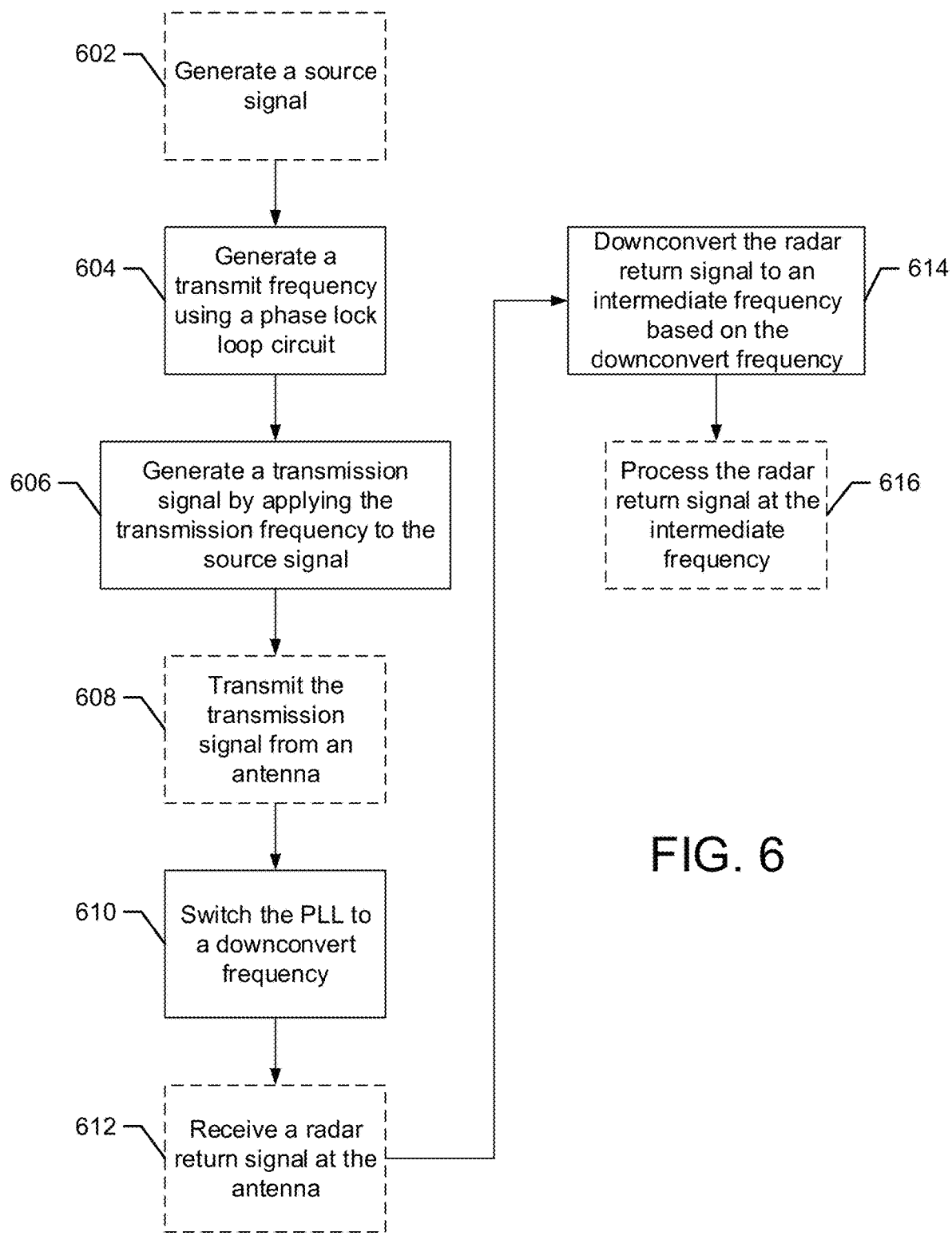

Having thus described the invention in general terms, reference will now be made to the accompanying drawings, which are not necessarily drawn to scale, and wherein:

FIG. 1A illustrates an example simple block diagram of a transceiver with three local oscillators, in accordance with some embodiments discussed herein;

FIG. 1B illustrates an example detailed block diagram of a transceiver with three local oscillators, in accordance with some embodiments discussed herein;

FIG. 2A illustrates an example simple block diagram of a transceiver with two local oscillators, in accordance with some embodiments discussed herein;

FIG. 2B illustrates an example detailed block diagram of a transceiver with two local oscillators, in accordance with some embodiments discussed herein;

FIG. 3A illustrates example simple block diagram of a transceiver with one local oscillator, in accordance with some embodiments discussed herein;

FIG. 3B illustrates example detailed block diagram of a transceiver with one local oscillator, in accordance with some embodiments discussed herein;

FIG. 4 illustrates an example phase lock loop circuit (PLL), in accordance with some embodiments discussed herein;

FIG. 5 illustrates a graph of a frequency shift of the PLL, in accordance with some embodiments discussed herein; and FIG. 6 illustrates a flowchart of example methods of operating a radar transceiver circuit according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Generally, in radar systems a magnetron generates a transmit signal on a fixed frequency and the return, or receive signal is downconverted by a fixed frequency local oscillator to an intermediate frequency (IF) of approximately 60 MHz for signal processing. Some example radar transceivers, such as pulse compression radars, may use a single PLL to serve as a source for both the transmission frequency upconvert and the receive signal downconvert frequency. However, the PLL is fixed at a single frequency and uses a vector modulator to generate a varying signal in frequency and amplitude. The signal may be upconverted by a local oscillator to the transmit frequency. The center of the intermediate frequency will therefore be similar to the center of the vector modulator signal. This configuration may have the undesirable effects of causing a significant number of unwanted transmissions due to suppression of the vector modulator or require further conversion steps with significant filtering. In both cases, the achieved output power may be have a significant reduction, such as 3 dB from a potential usable level. Although, the local oscillator could be changed prior to operation or for a range change, the local oscillator is not able to switch during operation.

In example embodiments of the present invention, the transceiver may include an LO, such as a PLL, configured to switch, e.g. transition or shift, between the transmit frequency and a downconvert frequency. The switch between the transmit frequency and a downconvert frequency may be configured to be extremely fast, such as 10-20 ns. This fast switching between the transmit frequency and the downconvert frequency may enable the elimination of one or more LOs, including but not limited to a LO dedicated to generation of a downconvert frequency for the receiving circuit, which may simplify the construction and operation of the transceiver.

Example Transceivers Including Three Local Oscillators

FIGS. 1A and 1B illustrate an example simple block diagram and detailed block diagram, respectively, of a transceiver 100 with three local oscillators. The transceiver 100 includes a transmit circuit 110, a reference circuit 130, and a receiver circuit 150. The transmit (TX) circuit includes a chirp generator 112, a transmit LO, e.g. TX PLL 114, a transmit modulator 116, and a power amplifier 118. The reference circuit (REF) 130 includes a surface acoustic wave (SAW) oscillator 132 and a reference LO, e.g. REF PLL 134. The receiver (RX) circuit 150 includes a receiver LO, e.g. RX PLL 152, a receiver front end 154, and a receiver mixer 156. Additionally, the transceiver 100 includes an analog to digital (A/D) converter 172 and a central processing unit (CPU) 174 for signal processing and an antenna 180 for signal transmission. The local oscillators, e.g. the transmit LO, the reference LO, and/or the receiver LO may be phase lock loop circuits (PLLs) configured to maintain an output signal in phase with the input signal. The PLLs may include a variable frequency oscillator and a phase detector in a feedback loop. The oscillator generates an output signal and the phase detector compares the phase of the output signal to the phase of the input signal and adjusts the oscillator to keep the phases matched.

In operation, the SAW oscillator 132 may generate a system reference frequency that is supplied to the chirp generator 112 and an REF PLL 134. The REF PLL may output an IF, such as approximate 4.6 GHz, which is supplied to both the TX PLL 114 and RX PLL 152 as a reference frequency. Coherence and frequency stability are achieved in the transceiver 100 by using this reference frequency for both the TX circuit 110 and the RX circuit 150.

The chirp generator 112 may be a field programmable gate array (FPGA) based direct digital synthesizer (DDS). The DDS may generate a frequency modulated source signal or source frequency, which is then provided to TX PLL 114 for hopping across the full transmission frequency range. The TX modulator 116 may then provide amplitude modulation to the transmission signal prior to increasing the transmission power by the power amplifiers 118. The transmission signal is then provided to the antenna 180 for transmission. By separating the frequency modulation provided by the DDS and the TX PLL 114 and the amplitude modulation provided by the TX modulator 116, a significant reduction in spectral leakage and an optimum output power is achieved.

A radar return (e.g., receive, reflection, etc.) signal is received by the antenna 180 and provided to the RX front end 154. The RX front 154 end includes the circuitry between the antenna 180 and the mixer 156. The RX front end 154 processes the signal at the original incoming radio frequency (RF), before it is converted to a lower intermediate frequency (IF) by the RX mixer 156.

As discussed above the reference frequency is also provided to the RX PLL 152. The RX PLL 152 generates a fixed offset to the center of the transmit frequency, or a downconvert frequency. The downconvert frequency is provided to the RX mixer 156 to convert the return signal to the IF. The return signal is provided to the A/D converter 172 and CPU 174 for signal processing, such as is known by one or ordinary skill in the art.

In an example embodiment, the REF PLL 134 and the RX PLL 152 have a loop bandwidth of approximately 1 MHz enabling hopping in the order of 10 μs. The TX PLL 114 has a loop bandwidth of approximately 6 MHz. The TX modulator 116 follows the TX PLL 114 and therefore also has a loop bandwidth of approximately 6 MHz. The internal frequency of each of the PLLs is in approximately 64-96 MHz. The internal frequency of the PLLs is limited by the maximum phase detector frequency of the PLL, which is generally approximately 100 MHz.

It has been determined that an increase in the tuning speed of the TX modulator 116 would significantly improve the accuracy of the modulation curve, especially in short compression curve ranges of 2 µs, 3 µs, or the like with an approximately 32 MHz modulation width. However, increasing the tuning speed of the TX modulator is dependent on increasing loop bandwidth of the TX PLL 114, which may be limited using complementary metal-oxide semiconductor phase detectors. Instead, an emitter-coupled logic (ECL) phase detector may be used enabling phase detector frequencies of over 1 GHz. Coherence within each of the clock sources may be enabled by basing each clock on one reference source. The reference source may be a multiple of the A/D clock and also usable as a multiplier source of the RX PLL 152 used to generate the downconvert frequency, e.g. offset. Example embodiments of transceivers including an ECL phase detector are discussed herein.

Example Transceivers Including Two Local Oscillators

FIGS. 2A and 2B illustrate an example simple block diagram and detailed block diagram, respectively, of a transceiver 100 with two local oscillators. The transceiver includes a transmit (TX) circuit 210, a reference circuit (REF) 230, and a receiver (RX) circuit 250. The TX circuit 210, includes a transmit controller 212, a transmit LO, e.g. TX PLL 214, a transmit modulator 216, and a power amplifier 218. The reference circuit 230 includes a SAW oscillator 232, a reference LO, e.g. REF PLL 236, and a multiplier 238. The RX circuit 250 includes a receiver front end 254, a receiver mixer 256, and a receiver multiplier 258. The transceiver 200 also includes an analog to digital (A/D) converter 272 and a central processing unit (CPU) 274 for signal processing and an antenna 280 for signal transmission. The local oscillators, e.g. the transmit LO and the reference LO, may be phase lock loop circuits (PLLs) configured to maintain an output signal in phase with the input signal. The PLLs may include a variable frequency oscillator and a phase detector in a feedback loop. The oscillator generates an output signal and the phase detector compares the phase of the output signal to the phase of the input signal and adjusts the oscillator to keep the phases matched.

The SAW oscillator 232 may be a 1 GHz saw oscillator which may provide input to a divider circuit to divide the output by eight to generate a 125 MHz clock for the A/D converter 272. Additionally, the 1 GHz signal may be provided to multiplier circuit 238 to generate a 5 GHz reference for the TX PLL 214, with a nominal output of 4.692-4.766 GHz. The resulting phase detector frequency of the TX PLL 214 may be approximately 234-308 MHz.

Similar to the chirp generator 112, discussed above in reference to FIGS. 1A and 1B, the TX controller 212 may include a FPGA based DDS frequency generator to generate the source frequency. The DDS frequency generator may be configured for the frequency modulation and general tuning of the source frequency and may be programmed to generate a fast coherent sweep to change the output frequency over 20 ns by 8 MHz (at 125 MHz, or 32 MHz at 9.4 GHz) and also to cover the frequency range from 9.384-9.532 GHz of the TX PLL 214. The source frequency may be doubled by a multiplier circuit prior to being supplied to the TX PLL 214. The resulting source frequency provided to the TX PLL 214 may be approximately 270 MHz. The TX PLL 214 may output a transmission signal at approximately 4.7 GHz. The TX modulator 216 may receive the approximately 4.7 GHz signal and double it to approximately 9.4 GHz using a multiplier circuit prior to amplitude modulation. In some example embodiments, the multiplier circuit, e.g. doubler, may be configured to be switched, which may assist pulse modulation. Since, the TX PLL 214 has a faster loop bandwidth and has a wider frequency range, the transceiver 200 may be enabled to generate a wider frequency range of transmission signals for frequency hopping. This frequency hopping may reduce jamming by other radars and avoid self-jamming caused by previous radar pulse transmission.

After the pulse for the pulse compression has been transmitted there is a time period before the return signals, e.g. received pulses, can be properly de-correlated. During this time period, the TX PLL 214 may be tuned, or switched, from the transmit frequency to the downconvert frequency. The TX PLL 214 may thereby act as both the TX PLL 114 and the coherent LO for the receiver, e.g. the RX PLL 152—referring back to the transceiver 100 discussed above in reference to FIGS. 1A and 1B. The tuning speed of the TX PLL 214 may be approximately 1 µs or less (for 32 MHZ). Turning to the example time frequency plot 500 illustrated in FIG. 5, the sweep direction of the pulse and a sideband of the downconvert frequency may be chosen such that the end point of the transmit pulse, such as an up sweep pulse, is relatively close to the desired downconvert frequency, or offset, thereby minimizing the difference in tuning, or switching, the transmit frequency to the downconvert frequency. The transmit frequency (TX) of the pulse curves generally upward ending relatively closer to the downconvert frequency (RX). The dotted line represents the time period between the transmission of the pulse and generation of the downconvert frequency (TX/RX transition), during which the TX PLL 214 switches, or transitions, between the transmit frequency and the downconvert frequency. The downconvert frequency, or offset, may be provided to the RX mixer 256 via the RX multiplier 258. Alternatively, the transmit pulse may be a down sweep.

In some example embodiments, the reference circuit includes a LO, e.g. REF LO 234, to generate a second downconvert frequency, or offset, for short range pulse mode, such as 10 m, which has 40 ns pulse and a 66 ns delay time period. Advantageously, the REF LO 236 may be a fixed frequency LO with limited phase noise requirements. As such, this embodiment includes only one tunable low phase noise frequency source or LO, particularly TX PLL 214, and one fixed frequency LO. In contrast the transceiver discussed with regard to FIGS. 1A and 1B included three tunable low phase noise LOs, TX PLL 114, REF PLL 134, and RX PLL 152.

Example Transceivers Including One Local Oscillator

FIGS. 3A and 3B illustrate an example simple block diagram and detailed block diagram, respectively, of a transceiver 300 with one local oscillator. The transceiver includes a transmit (TX) circuit 310, a reference circuit (REF) 330, and a receiver (RX) circuit 350. The TX circuit 310, includes a transmit controller 312, a transmit LO, e.g. TX PLL 314, a transmit modulator 316, and a power amplifier 318. The reference circuit 330 includes a SAW oscillator 332 and a multiplier 328. The RX circuit 350 includes a receiver front end 354, a receiver mixer 356, and a receiver multiplier 358. The transceiver 300 also includes an analog to digital (A/D) converter 372 and a central processing unit (CPU) 374 for signal processing and an antenna 380 for signal transmission. The local oscillator, e.g. the transmit LO, may be a phase lock loop circuit (PLL) configured to maintain an output signal in phase with the input signal. The PLL may include a variable frequency oscillator and a phase detector in a feedback loop. The oscillator generates an output signal and the phase detector compares the phase of the output signal to the phase of the input signal and adjusts the oscillator to keep the phases matched.

The transceiver 300 may be substantially similar to the transceiver 200 discussed above in regard to FIGS. 2A and 2B. However, the tuning speed of the TX PLL 314 may be increased, such that output frequency can be tuned, or switched, from the transmit frequency to the downconvert frequency, or offset, in the short range pulse mode. Particularly, the TX PLL 314 switches from the transmit frequency directly after the 40 ns pulse to the downconvert frequency in less than 40 ns (6 m or 6.6 ns/1 m). This configuration enables the fixed frequency LO, e.g. the REF LO 236 from FIGS. 2A and 2B, to be eliminated. As such, only one LO, e.g. TX 314 is provided to generate both the transmit frequency and the downconvert frequency.

Referring also to FIG. 4, which illustrates the TX PLL 314, the TX PLL 314 may be configured to have a bandwidth of at least 20 MHz. This bandwidth may be achieved by utilizing a phase detector 315 with a frequency of at least 250 MHz, which may enable a sufficiently high cycle time for the control loop to tune the output of the TX PLL 314 over 16 MHz in 40 ns (or 400 MHz/μs). Although the DDS of the TX controller 312 is able to change frequency quickly without phase jumping, the TX PLL 314 is configured to maintain phase lock to limit or prevent loss of coherency.

In an example embodiment, the transceiver 300 may include a DDS frequency generator 311 configured to provide frequency modulation and general tuning. The DDS 311 may be programmed to generate a fast coherent sweep, such as an up sweep, to change the output frequency over 20 ns by 8 MHz (at 125 MHz, or 32 MHz at 9.4 GHz) and also to cover the required TX PLL 314 frequency range from 9.384-9.532 GHz. A multiplier 313, e.g. a DDS doubler circuit, may be provided between the DDS 311 and the TX PLL 314 to achieve 234-308 MHz reference frequency for input to the TX PLL 314. The TX PLL may include a comparator 317 to convert the reference frequency RF signal to ECL for input into an ECL phase detector 315. The ECL phase detector 315 may have a minimum frequency (Fmin) of at least 400 MHz. The TX PLL 314 may also include an active 30 MHz loop filter with an at least 400 MHz operation amplifier. The TX PLL 314 may include a voltage controlled oscillator (VCO) configured to a modulation frequency (Fmod) of at least 200 MHz.

As detailed above, the transceiver 200, 300 may include a PLL configured to switch between the transmit frequency and a downconvert frequency. The switch between the transmit frequency and a downconvert frequency may be configured to be extremely fast, such as 10-20 ns. This fast switching between the transmit frequency and the downconvert frequency may enable the elimination of one or more LOs, including but not limited to a LO dedicated to generation of a downconvert frequency for the receiving circuit, which may simplify the construction and operation of the transceiver.

Example Flowchart(s) and Operations

Embodiments of the present invention provide methods and apparatus for operating a radar transceiver circuit. Various examples of the operations performed in accordance with embodiments of the present invention will now be provided with reference to FIG. 6.

FIG. 6 illustrates a flowchart according to example methods for operating a radar transceiver circuit according to an example embodiment. The operations illustrated in and described with respect to FIG. 6 may, for example, be performed by, with the assistance of, and/or under the control of one or more of the TX circuit 210, 310, the REF circuit 230, 330, the RX circuit 250, 350, the TX PLL 214, 314, the TX controller 212, 312, the RX mixer 256, 356, the CPU 274, 374, and/or antenna 280, 380. The method may include generating a transmit frequency using a phase lock loop circuit at operation 604, generate a transmission signal by applying the transmit frequency to the source signal at operation 606, switching the phase lock loop circuit to a downconvert frequency at operation 608, and downconverting a radar return signal to an intermediate frequency by applying the downconvert frequency at operation 610.

In some embodiments, the method may include additional, optional operations, and/or the operations described above may be modified or augmented. Some examples of modifications, optional operations, and augmentations are described below, as indicated by dashed lines, such as, generating the source signal at operation 602, transmitting the transmission signal from an antenna at operation 608, receiving a radar return signal at the antenna at operation 612, and processing the signal at the intermediate frequency at operation 616.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:
1. An apparatus comprising:
a transmit signal generator for a pulse compression radar, wherein the transmit signal generator is electrically connected to an antenna and configured to generate a transmission signal at a transmit frequency;
a receiver circuit electrically connected to the antenna and configured to receive a radar return signal and downconvert the radar return signal at a downconvert frequency for signal processing; and
a phase lock loop circuit configured to be tuned to output both at the transmit frequency for transmission of the transmission signal by the antenna and at the downconvert frequency for downconverting a frequency of the radar return signal for further signal processing, wherein the transmit frequency is different from the downconvert frequency, and wherein the output of the phase lock loop circuit repeatedly shifts between the transmit frequency and the downconvert frequency.

2. The apparatus of claim 1, wherein the phase lock loop circuit has a loop bandwidth of at least 20 MHz.

3. The apparatus of claim 1, wherein the phase lock loop circuit comprises an emitter-coupled logic (ECL) phase detector.

4. The apparatus of claim 3, wherein the ECL phase detector has a phase detection frequency of at least 250 Mhz.

5. The apparatus of claim 1 further comprising:
a direct digital synthesizer (DDS) configured to supply a source frequency to the phase lock loop circuit.

6. The apparatus of claim 5, wherein the DDS is configured to change the source frequency by generating a coherent sweep, and wherein the transmit frequency comprises a frequency sweep pulse based on the coherent sweep.

7. The apparatus of claim 6, wherein the frequency sweep pulse comprises an up sweep or a down sweep.

8. A system comprising:
an antenna configured to transmit and receive radio frequency signals;
a radar transceiver circuit comprising:
    a transmit signal generator electrically connected to the antenna and configured to generate a transmission signal at a transmit frequency;
    a receiver circuit electrically connected to the antenna and configured to receive a radar return signal and downconvert the radar return signal at a downconvert frequency for signal processing; and
    a phase lock loop circuit configured to be tuned to output both at the transmit frequency for transmission of the transmission signal by the antenna and at the downconvert frequency for downconverting a frequency of the radar return signal for further signal processing, wherein the transmit frequency is different from the downconvert frequency, and wherein the output of the phase lock loop circuit repeatedly shifts between the transmit frequency and the downconvert frequency.

9. The system of claim 8, wherein the phase lock loop circuit has a loop bandwidth of at least 20 MHz.

10. The system of claim 8, wherein the phase lock loop circuit comprises an emitter-coupled logic (ECL) phase detector.

11. The system of claim 10, wherein the ECL phase detector has a phase detection frequency of at least 250 Mhz.

12. The system of claim 8, wherein the radar transceiver circuit further comprises:
a direct digital synthesizer (DDS) configured to supply a source frequency to the PPL.

13. The system of claim 12, wherein the DDS is configured to change the source frequency by generating a coherent sweep, and wherein the transmit frequency comprises a frequency sweep pulse based on the coherent sweep.

14. The system of claim 13, wherein the frequency sweep pulse comprises an up sweep or a down sweep.

15. A method of operation for a radar transceiver circuit comprising:
generating a transmit frequency using a phase lock loop circuit;
generate a transmission signal by applying the transmit frequency to a source signal;
switching the phase lock loop circuit to a downconvert frequency; and
downconverting a radar return signal to an intermediate frequency by applying the downconvert frequency, wherein the transmit frequency is different from the downconvert frequency.

16. The method of claim 15 further comprising:
generating the source signal by a direct digital synthesizer (DDS);
transmitting the transmission signal from an antenna;
receiving the radar return signal at the antenna; and
processing the radar return signal at the intermediate frequency.

17. The method of claim 15, wherein the phase lock loop circuit has a loop bandwidth of at least 20 MHz.

18. The method of claim 15, wherein the phase lock loop circuit comprises an emitter-coupled logic (ECL) phase detector with a phase detection frequency of at least 250 Mhz.

* * * * *